United States Patent [19]

Ford et al.

[11] Patent Number: 4,817,428

[45] Date of Patent: Apr. 4, 1989

[54] DIRECT WEIGHING OF LIQUID HANDLING PLANT

[75] Inventors: Lionel H. Ford, Blackpool; Samuel N. Oruh, Lytham; Jaswant Singh, Forton; Geoffrey S. Coldwell, Preston Lancashire, all of United Kingdom

[73] Assignee: United Kingdom Atomic Energy Authority, London, England

[21] Appl. No.: 83,283

[22] Filed: Aug. 10, 1987

[30] Foreign Application Priority Data

Aug. 21, 1986 [GB] United Kingdom ................. 8620360

[51] Int. Cl.$^4$ ............................................. G01N 9/06
[52] U.S. Cl. .......................................... 73/434; 177/16
[58] Field of Search ............... 376/245, 258, 272, 293; 252/626, 627; 422/159; 177/211, 246, 16; 73/433, 434

[56] References Cited

U.S. PATENT DOCUMENTS

| | | |
|---|---|---|
| 2,459,542 | 1/1949 | Rosenberger ........................ 73/433 |
| 3,050,145 | 8/1962 | Lane ..................................... 73/433 |
| 3,330,160 | 7/1967 | Stevenson ............................ 73/433 |
| 3,812,723 | 5/1974 | Barron ................................. 73/434 |
| 4,374,474 | 2/1983 | Cain ..................................... 73/433 |
| 4,521,371 | 6/1985 | Peck et al. .......................... 376/245 |
| 4,680,166 | 7/1987 | Forster ................................ 422/159 |

FOREIGN PATENT DOCUMENTS 2653516  6/1978  Fed. Rep. of Germany ........ 73/434
1010662 11/1965  United Kingdom .

Primary Examiner—Deborah L. Kyle
Assistant Examiner—Daniel Wasil
Attorney, Agent, or Firm—William R. Hinds

[57] ABSTRACT

On-line density/weight measurements are made in liquid handling plant by isolating part of the plant, e.g. a tank such as an accountancy tank in nuclear fuel reprocessing plant, from the remainder of the plant in terms of force transmission and supporting the isolated part through the agency of a null-deflection weighing mechanism which cna be tared off to indicate the weight of liquid (and any solids content) occupying the isolated part of the plant.

7 Claims, 4 Drawing Sheets

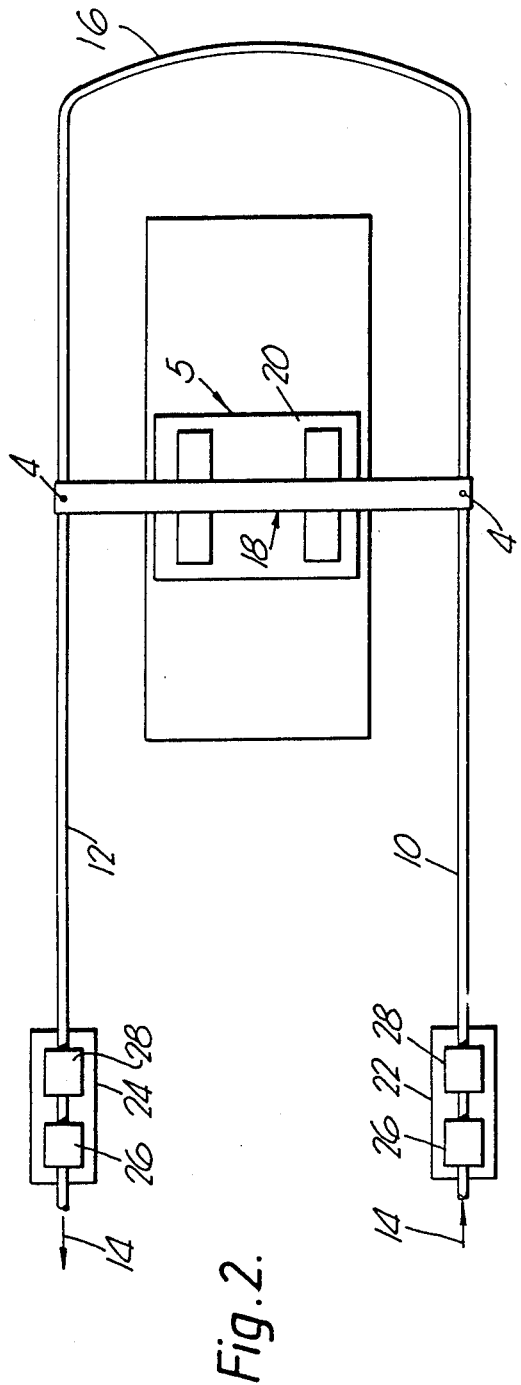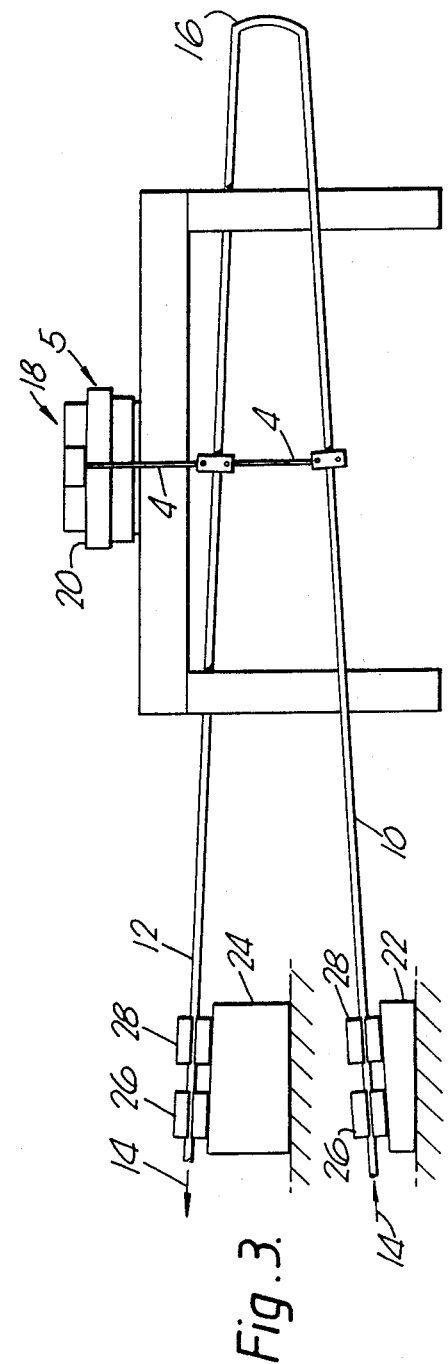

DIRECT WEIGHING OF LIQUID HANDLING PLANT

This invention relates to liquid handling plant such as chemical processing plant. In such plant, there is usually a requirement to monitor paratmeters such as the density or composition of the liquids. The present invention involves the use of direct weighing to enable measurements of such parameters to be made.

Generally according to the present invention, there is provided, in a liquid handling plant including pipework defining part of a liquid flow path through the plant, a weight monitor for the determination of the density of liquid in the plant comprising pipe constraining means operative on the pipework at points fixed in space to define legs of the pipework cantilevered from each respective constraining means, a junction intercommunicating the legs at their ends remote from the respective constraining means to constitute as a known volume the liquid which, in use, is situated within the structure comprising the legs and junction, and a null deflection weighting system coupled to and supporting the structure for enabling the weight of the known volume to be measured and hence the density of the liquid to be deduced.

The structure may comprise a section of pipework or a vessel and pipework joining the vessel to the remaining plant. The weight of the structure is supported by the weighing system and since the latter operates in a null deflection mode, the structure remains substantially stationary in space despite changes in the weight of liquid contained by the structure, thereby avoiding stressing of the pipework which would otherwise occur as a result of displacement of the structure and would, in turn, affect the accuracy of weighing.

The constraining means conveniently may comprising clamping arrangements each comprising two clamp components separated by a gap to minimise force transmission between the structure and the remaining plant.

In one embodiment of the invention, for use in situations in which liquid density measurements are to be made, the structure comprises a section of pipework of retroverted configuration connected at its opposite ends to unstream and downstream parts of the liquid flow path through the remaining plant, the retroverted pipework section optionally including an enlarged chamber and the retroverted pipework section and chamber (where employed) having a known volume. The flow and return legs of the retroverted pipe section may be disposed one above the other to form a generally vertical hairpin configuration or they may be disposed generally side-by-side to form a generally horizontal hairpin configuration; in both cases, the junction between the legs must be left free and unconstrained. Where the structure includes a chamber this may be located between the flow and return legs of the pipework section.

It will be seen that the density of the liquid within the structure may be readily determined from the measured weight of the liquid coupled with the known volume of the structure. In practice, the usual formula relating density d to mass m and volume v (ie $d = m/v$), may require modification to include a correction term or terms to compensate for factors such as deformation of the pipework, temperature variations and liquid flow rates. Such correction terms may be derived empirically and may vary from one plant configuration to another. In the case of this embodiment, density measurements can be made without extracting liquid from the plant and recycling it back into the plant, which is of particular advantage in situations involving hazardous materials, eg radioactive materials as in the nuclear industry.

Preferably both the flow and return legs of the pipework section are coupled to the weighing system although it is also within the ambit of the invention for only one of the legs to be coupled to the weighing system. Where a chamber is included in the structure, the coupling or couplings may be made between the leg(s) and the weighing system or alternatively the chamber may be coupled to the weighing system. The optimum position of the coupling point or points may be determined empirically and may not necessarily coincide with the centre of gravity of the structure. The results of a series of tests carried out by the Applicants on one structure comprising a pipework section formed in a generally horizontal hairpin configuration indicated that the optimum positions of the coupling points lie between the flow leg/return leg junction and the theoretical centre of gravity of the structure.

In another embodiment of the invention, the structure may comprise a relatively massive tank and pipework sections connecting the tank to the remaining plant for supply and discharge of liquor to and from the tank. In this embodiment, each pipework section may be of retroverted configuration as described above and the attachment points for the couplings between the structure and the weighing system may be located on the tank.

One application of this embodiment of the invention resides in the accountancy of the plutonium and uranium contents of liquors derived from the dissolution of nuclear fuel materials in nitric acid in the course of nuclear fuel reprocessing. In this application, the liquor is supplied to a harp-shaped accountancy tank from which samples are periodically extracted (following mixing of the content of the tank) for analysis to determine plutonium/uranium concentrations. Hitherto, calculations of the total plutonium/uranium content has been effected by determining the volume of liquor in the tank by using pneumercators to measure liquor level and density to enable an indirect value to be derived for the weight of the tank contents. In accordance with the present invention, the accountancy tank is weighed directly thus avoiding possible sources of error due to the presence of bubbles in the liquor.

The accountancy tank is accomodated within a containment cell and is suspended from the weighing system which may be located above the roof of, and hence external to, the containment cell so as to facilitate maintenance.

To promote further understanding of the invention, several embodiments will now be described by way of example only with reference to the accompanying drawings, in which:

FIG. 2 is a diagrammatic plan view of a second embodiment;

FIG. 3 is a side view of the second embodiment;

Figure 1:
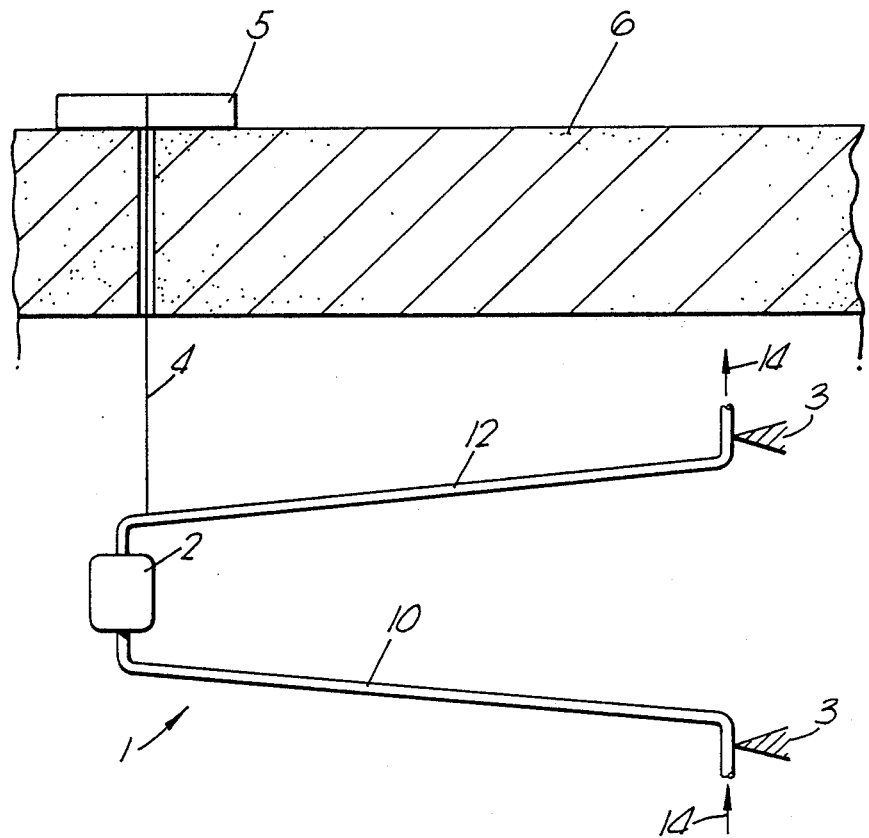
FIG. 1 is a diagrammatic view of part of a chemical processing plant in which density of the liquor flowing through the plant is measured by direct weighing.

As shown in FIG. 1, a pipe 1 of generally hairpin configuration includes a chamber or vessel 2 at the junction between the flow leg 10 and return leg 12 of the pipe, the pipe and chamber being of a known volume. The pipe is held at constraints 3 which are fixed in space and is supported by a tie-bar 4 which is connected to a weighbridge. The weighbridge 5 is of the null deflection type as will be explained further below.

The pipe 1 forms part of the flow line of a chemical processing plant, the remainder of which is not shown, liquor flow through the pipe 1 being indicated by arrows 14. The constraints 3 serve to isolate the pipe 1 from the remainder of the chemical plant flow line in terms of transmission of forces, ie to minimise stresses, reaction loads and thermal expansion effects which may otherwise affect weighing of the pipe 1 and chamber 2.

Measurements are made with the pipe and chamber initially empty, the weighbridge being tared off so that the weighbridge output indicates the weight of liquid within the pipe 1 and chamber 2. In use, with the pipeline filled with liquor (which can be flowing or stationary) and the pipe fixed against movement by the constraints 3, the weighbridge 5 supports the weight of the pipeline and liquid and provides a reading for weight of a known volume of the liquor from which the density of the liquor can be calculated using the usual formula ($d = m/v$) with appropriate empirically-derived correction terms applied where necessary, as described previously.

The arrangement is particularly suitable for determining the density of a material-bearing liquor flowing in, for example, a nuclear fuel reprocessing plant. The pipe and chamber can be located within a containment cell having a roof 6 with the tie-bar 4 extending through the roof to the weighbridge 5. The weighbridge 5 is thus readily accessible for periodic maintenance and calibration.

In FIG. 1, the pipework is shown in the form of a generally vertical hairpin configuration, ie with the flow leg 10 and return leg 12 disposed one above the other. FIGS. 2 and 3 shown an alternative arrangement in which the pipework is in the form of a generally horizontal hairpin configuration, ie with the flow leg 10 and return leg 12 extending side by side. In FIGS. 2 and 3, the pipework is illustrated without an enlarged chamber although one may be included if desired and may be located at the junction 14 between the flow and return legs. In this embodiment it will be seen that both legs 10, 12 are coupled to the weighbridge via respective tie rods 4 and a crossmember 18 which seats on the platform 20 of the weighbridge 5 and serves to spread the load across the weighbridge. Also, the legs of the hairpin pipework are each shown rigidly clamped to immovable fixtures 22, 24 by a pair of spaced apart saddle-type clamps 26, 28 to isolate transmission of external forces to the pipework 10, 12 from the remaining plant. The use of a pair of spaced clamps has been found to be more effective than a single longer clamp, the reason being that any small movement transmitted by the first clamp 26 is eliminated by the second clamp 28.

Figure 4:
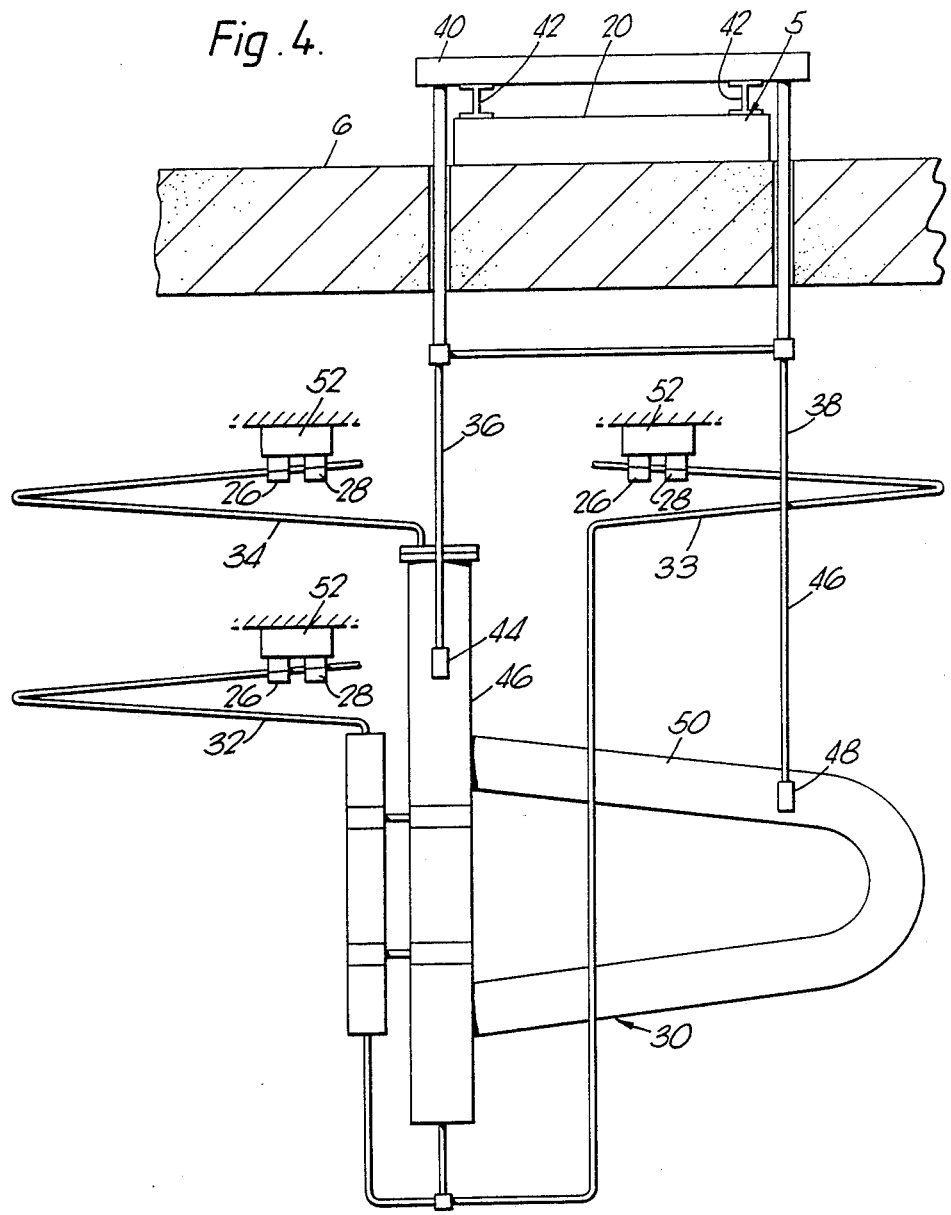
FIG. 4 is a diagrammatic front elevational view of a weighbridge-supported accountancy tank forming part of a nuclear fuel processing plant.

Referring now to FIG. 4, there is shown the harp-shaped accountancy tank 30 of a nuclear fuel reprocessing plant, the tank being connected to the remaining plant by various sections of pipework (only some of which are illustrated and depicted by reference numerals 32, 33, 34) for use in filling and emptying the tank, agitating its contents and extracting and returning samples for analysis. To enable the plutonium/uranium contents present in feed liquors to be determined, the tank 30 is coupled to a weighbridge 5 through two sets of tie rods 36, 38, crossmember 40 and H-section bearers 42 which seat on the platform 20 of the weighbridge. The tie rods 36 are connected to brackets or lugs 44 on opposite sides of the vertical limb 46 of the tank while the tie rods 38 are coupled to brackets or lugs 48 on opposite sides of the U-shaped side limb 50 of the tank. The connections between each tie rod 36, 38 and crossmember 40 may be made via knife edges (not shown).

All of the pipework sections, eg 32, 33, 34, connecting the tank 30 to the remaining part of the plant are formed with a retroverted cantilever configuration, eg as generally horizontally disposed hairpin sections, with one end connected to the accountancy tank unit and their opposite ends rigidly clamped by double clamp arrangements 26, 28 to fixed structure 52. The pipework sections extend beyond the clamping arrangements to provide continuity with the remainder of the plant but in such a way that the accountancy tank unit and associated pipework sections, eg 32, 33, 34, are substantially isolated from the remaining plant in terms of force transmission. Although only three pipework sections 32, 33, 34 are illustrated, in practice there will usually be seven such pipework sections all of a cantilevered retroverted configuration and they are conveniently orientated and designed in such a way that they tend to compensate for one another in terms of thermal expansion effects, ie so that the net horizontal displacement of the accountancy tank as a result of thermal expansion of the pipework sections is minimised. In practice, the accountancy tank unit is initially suspended from the weighbridge prior to effecting the connections with the remaining plant so that pipework sections can be connected to the remaining plant in such a way that they are substantially unstressed.

Figure 5:
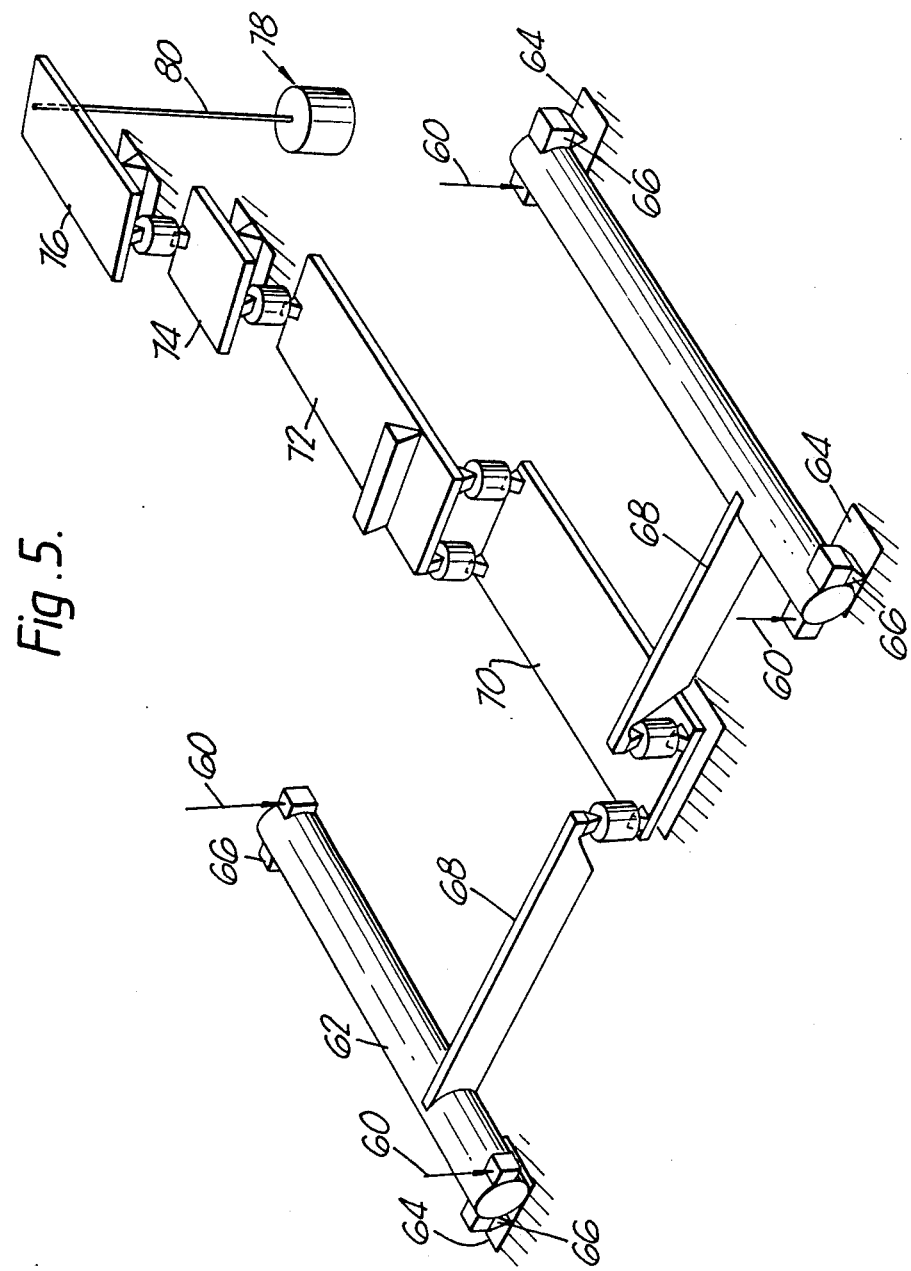
FIG. 5 is a schematic perspective view of a null deflection weighbridge.

FIG. 5 illustrates one form of null deflection weighbridge which may be employed in the embodiments shown in FIGS. 1–4. A feature of the weighbridge is that its load receiver (eg platform 20) in FIG. 4 does not undergo any significant displacement as the applied load changes, since the applied load is counterbalanced by an opposing force which, in the illustrated embodiment, is generated electromagnetically and amplified by a mechanical lever system. The load receiver, ie platform 20, acts at points 60 on a pair of spaced parallel torque tubes 62 mounted on fixed surfaces 64 by knife edge fulcrums 66. The torque loading applied via points 60 is transmitted via transverse lever arms 68 rigidly connected to the torque arms tubes 62 to a lever system comprising levers 70, 72, 74, 76. Lever 76 is connected to an electromagnetic actuator 78 which may comprise a fixed magnet and a coil movable with rod 80, the force exerted by the actuator 78 being controllable according to the electrical current supplied to the coil. Thus, by supplying the actuator with electrical current of appropriate magnitude, the load applied to the weighbridge can be counterbalanced and the value of the current necessary for this purpose provides a measure of the applied load. In practice, a sensor arrangement is provided to detect any displacement as a result of the applied load, eg the sensor may monitor the position of the rod 80, and any displacement is immediately compensated for by a feedback system which varies the current supply to the actuator 78 to restore the rod 80 to a predetermined position and hence counterbalance the load applied to the weighbridge.

We claim:

1. In a liquid handling plant including pipework defining part of a liquid flow path through the plant, a weight monitor for the determination of the density of liquid in the plant comprising pipe constraining means operative on the pipework at points fixed in space to define legs of the pipework cantilevered from each respective constraining means, a junction intercommunicating the legs at their ends remote from the respective constraining means to constitute as a known volume the liquid which, in use, is situated within the structure comprising the legs and junction, and a null deflection weighing system coupled to and supporting said structure for enabling the weight of the known volume to be measured and hence the density of the liquid to be deduced.

2. A weight monitor as claimed in claim 1 in which the legs of the pipework together with the junction form a pipework section which is U-shaped.

3. A weight monitor as claimed in claim 1 in which a vessel forms the junction intercommunicating the pipework legs at their ends remote from the respective constraining means, the vessel being spaced from said means by the cantilevering of the legs therefrom.

4. A weight monitor as claimed in claim 1 in which the constraining means comprises at least one clamping device rigidly securing the adjacent end of the cantilevered leg defined thereby.

5. In nuclear fuel reprocessing plant for handling fissile material-bearing liquor, the combination comprising an accountancy tank, pipework for connecting the accountancy tank to the remainder of the plant, pipe constraining means operative on the pipework at points fixed in space wherefrom legs of the pipework cantilevered from each respective constraining means extend to and, at their ends remote from the respective constraining means, intercommunicate with the accountancy tank, and a null deflection weighing system coupled to and supporting the tank.

6. The combination as claimed in claim 5 in which the accountancy tank is located in a containment cell having a roof and the weighing system is located above the roof externally of the cell and is coupled to the tank by tie rod members extending through the roof.

7. The combination as claimed in claim 5 in which the constraining means comprises at least one clamping device rigidly securing the adjacent end of the leg cantilevered therefrom.

* * * * *